April 4, 1944.  E. C. PATTEE  2,345,626
SOLVENT EXTRACTING APPARATUS
Filed Jan. 6, 1941
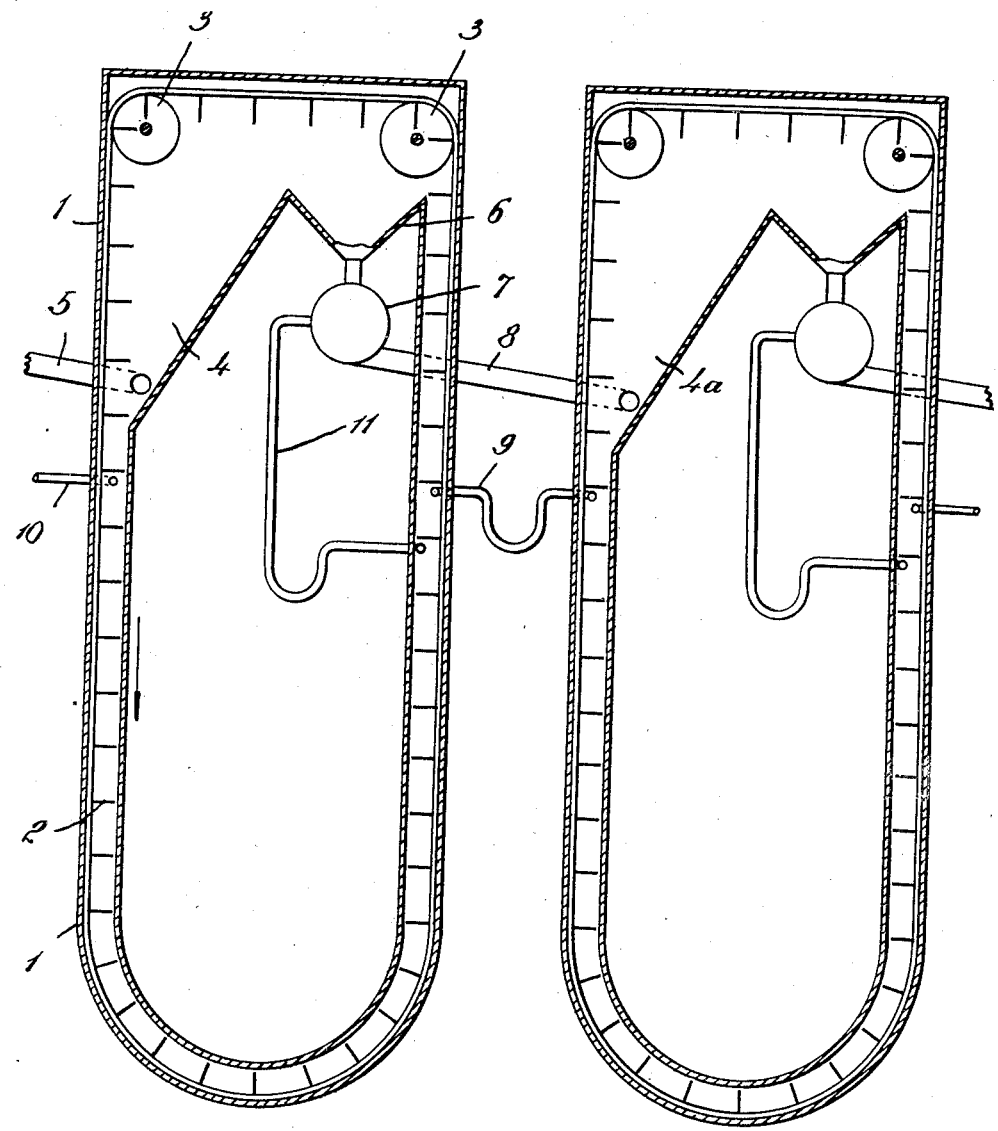
Ellis C. Pattee
INVENTOR
BY
Pennie Davis Marvin & Edmonds
ATTORNEYS Patented Apr. 4, 1944

2,345,626

UNITED STATES PATENT OFFICE 2,345,626

SOLVENT EXTRACTING APPARATUS

Ellis Charles Pattee, Cincinnati, Ohio, assignor to National Distillers Products Corporation, New York, N. Y., a corporation of Virginia Application January 6, 1941, Serial No. 373,267

2 Claims. (Cl. 23—270)

This invention relates to apparatus for the continuous extraction of materials, such as grains, rice, bran, oleaginous seeds or their flakes, wood chips, and the like by liquid solvents such as water, solutions, hydrocarbons, oils, fats, alcohols, and other liquids.

In my Patent No. 2,187,890 I have illustrated and described apparatus designed for this purpose. It comprises a vertical extraction vessel situated between the legs of a U-shaped housing through which an endless conveyer passes. Material to be extracted is fed into the upper end of the vessel and moves downward under mechanical agitation while the extracting solvent is fed into the lower end of the vessel and moves upward to overflow near the upper end. The extracted material passes from the lower end of the vessel into the U-shaped housing and is lifted by the conveyer through the upward leg of the U to an overhead hopper feeding a press which expressed the solvent, returning it to the downward leg of the housing, whence it finds its way into the lower end of the extraction vessel to mingle with the incoming fresh solvent. The pressed solids are discharged. Although this apparatus constitutes a substantial improvement over prior extraction devices, I have made still further improvements which constitute the subject matter of the present invention. For example, I have discovered that the extraction vessel with its agitating mechanism can be entirely eliminated and the extraction performed in the U-shaped housing, the material being fed to the downward leg of the U at its upper end and carried around by the conveyer, through the solvent, preferably flowing counter-current, to the press. I have also eliminated the possibility of jamming by providing means whereby excess material fed to the press hopper spills over and automatically blocks further feed of fresh material to the apparatus. I have also found that better results are obtained by extracting in more than one stage with intermediate pressing.

In the accompanying drawing I have illustrated in vertical section a preferred embodiment of my invention. The apparatus shown comprises two units arranged to operate in series, although, of course, either can be operated alone. As the units are identical in construction and operation I shall describe only one in detail, the corresponding parts in the other being designated by the same reference numerals with the suffix A.

The apparatus illustrated comprises a U-shaped liquid-tight housing 1 through which passes an endless conveyer 2 suspended from and driven by sprockets 3 in the direction indicated by the arrow. This conveyer is spaced from the walls of the housing a distance sufficient to permit free flow of solvent past the conveyer and through the material carried by its flights. The upper end of the downward leg of the U is provided with a feed hopper 4 into which material to be extracted is fed through a chute 5 and carried thence by the conveyer through the housing to a discharge or press hopper 6 at the upper end of the other leg of the U. The discharge hopper is smaller than the feed hopper and mounted at a higher level. The two are, however, contiguous along their upper inner edges; thus any overflow from the discharge hopper will spill into the feed hopper, whereas movement in the reverse direction is virtually impossible. Extracted material from the hopper 6 passes downward to a press 7 from which the solids are discharged through a chute 8.

The extraction solvent enters the upward leg of the housing through an inlet conduit 9, passes through the housing and overflows through an outlet conduit 10 in the downward leg. Solvent expressed from the press 7 is returned to the housing through conduit 11, entering the upward leg with the incoming solvent near the conduit 9.

The apparatus operates as follows: The material to be extracted is fed to the lower end of the feed hopper 4 through chute 5 where it is picked up by the flights of the conveyer and carried through the housing. Meanwhile solvent entering through conduit 9 is flowing counter-current through the housing and hence comes into intimate contact with the material on the conveyer and removes its soluble content. At the upper end of the upward leg the conveyer dumps its load of extracted material into the hopper 6 which feeds to the press 7. Much of the solvent which saturates the material emerging from the bath drains back as the conveyer moves from the liquid level toward its sprocket but much is carried over, and this is expressed, as far as possible, by the press and returned to the housing through conduit 11.

Where two units are employed in series, as illustrated, the extracted material from the press of the first unit passes from the discharge chute 8 into the feed hopper 4A of the second for further extraction, and the discharged solvent from the second unit flows into the inlet conduit 9 of the first.

Each unit is self-contained, all extraction taking place within the U-shaped legs of the housing. In the event that the conveyer dumps extracted material into the hopper 6 faster than the press can take care of it, the excess of extracted material spills over into the feed hopper 4 and blocks the feed chute 5, thereby interrupting the flow of fresh material. In this way the feed of material to the press is automatically limited to its capacity and jamming is prevented. In addition, the speed of conveyer travel can, of course, be regulated. Although each unit can be operated separately I have found that time can be saved and better results obtained by the use of multi-stage operation, with its intermediate pressing.

Although I have described the use of a mechanical press for expressing solvent from the saturated extracted material other means, such as a centrifuge might well be employed. I have also described the solvent as flowing counter-current to the movement of the material and this is, I believe, the more effective practice. However, the flow can be made concurrent without necessitating any change in the apparatus.

Although I have described this apparatus for use in extracting soluble substances from solid materials, it can be used as a continuous reaction apparatus. An example of its use as a reaction apparatus would be the nitration of cellulose, wherein cellulose would enter as a solid and be carried by the conveyor counter-current to a flow of nitric acid solution; during the time of contact the cellulose would react with the acid to form nitrocellulose.

I claim:

1. Extraction apparatus comprising a U-shaped housing, an endless conveyor in the housing, said conveyor being constructed and arranged to move down one leg of the U and up the other, a feed hopper at the upper end of and feeding into that leg of the housing in which the conveyor is to move downwardly, a chute for feeding material to be extracted to the hopper, an inlet for an extracting solvent in the other leg of the housing, an outlet in the leg in which the conveyor is to move downwardly, a press at the upper end of the housing, a press hopper above and connected to the press and adjoining the feed hopper but at a higher level, the upper run of the conveyor being constructed and arranged to dump extracted material into the press hopper, said hopper being constructed and arranged so that any overflow in said hopper will spill into the feed hopper and block the feed chute, a conduit for returning expressed solvent to the housing adjacent the solvent inlet, and means for discharging pressed solids.

2. Extraction apparatus comprising a U-shaped housing, an endless conveyor in the housing, said conveyor being constructed and arranged to move down one leg of the U and up the other, a feed hopper at the upper end of and feeding into that leg of the housing in which the conveyor is to move downwardly, means for feeding material to be extracted to the hopper, an inlet for an extracting solvent in the other leg of the housing, an outlet in the leg in which the conveyor is to move downwardly, means located at the upper end of said housing for separating the material and the extracting solvent, a second hopper above and feeding into said separation means and adjoining the first hopper for receiving extracted material from the upper run of the conveyor, means for returning the extracted solvent to the said other leg of the housing, and means for discharging the extracted material.

ELLIS CHARLES PATTEE.